Patented Aug. 27, 1929.

1,726,170

UNITED STATES PATENT OFFICE.

JOSEPH W. BRITTON AND WILLIAM H. WILLIAMS, OF MIDLAND, MICHIGAN, ASSIGNORS TO THE DOW CHEMICAL COMPANY, OF MIDLAND, MICHIGAN, A CORPORATION OF MICHIGAN.

METHOD OF MAKING ANILINE.

No Drawing. Application filed March 1, 1926, Serial No. 91,565. Renewed January 11, 1929.

The present improvements have more particular regard to the preparation of aniline or phenylamine, $C_6H_5.NH_2$, from the corresponding halogenated benzene, e. g. chlorobenzene, by direct reaction with ammonia. We have discovered that this reaction is greatly promoted and a much higher yield of aniline obtained by the addition to the reaction mixture of certain ingredients as hereinafter set forth. The manner in which such ingredients are derived, as well as the method of their use, will now be fully described and particularly pointed out in the claims, the following description setting forth but one of the various ways in which the principle of the invention may be used.

The following is given as a specific example of the procedure involved in carrying out our improved method or process using mono-chlorobenzene and aqueous ammonia, viz:—

Such chlorobenzene is mixed with a 25 per cent aqueous ammonia solution in such amount as to furnish from four to five mol. of anhydrous ammonia to one mol. of chlorobenzene. This mixture is then charged with from 0.1 to 0.2 mol. of cuprous chloride or cuprous oxide into a suitable closed reaction chamber, such as an iron autoclave, capable of withstanding a working pressure as high as 1,000 pounds per square inch, and the mixture thereupon heated to a temperature of from 150 to 250 degrees C. and at a corresponding pressure, viz, from 500 to 1,500 pounds per square inch. The time of heating will vary with the temperature and pressure thus applied from 12 hours for the lower temperature to from 5 to 6 hours at the higher temperature. It has been found, moreover, that more satisfactory results are obtained by initially heating the mixture to a temperature of approximately 180 degrees C. for 5 or 6 hours and then raising such temperature to slightly over 200 degrees and there maintaining it for several hours more.

Upon completion of the reaction the products, still in the form of a liquid mixture, resulting therefrom are discharged into a suitable closed vessel for removal first of the ammonia, then of the aniline. Upon standing the aniline oil containing unreacted chlorobenzene with some diphenylamine and a small amount of water will settle out as a bottom layer separate from the aqueous solution containing ammonium chloride with any excess of ammonia present. Such aqueous layer will also contain dissolved therein a small quantity of aniline and what is more important for the present purpose certain copper ammoniacal compounds derived from the cuprous chloride or oxide introduced into the reaction mixture as aforesaid. The top layer consisting of such aqueous solution is then run off and treated with the soluble oxide or hydroxide of any alkali metal or alkaline earth, metal (e. g. caustic soda or lime) in an amount somewhat in excess of the ammonium chloride contained therein, thereby freeing the ammonia which is steamed out for use over again. The caustic compound also has the effect of causing the aforesaid copper compounds, the exact composition of which has not been ascertained, to precipitate out in the form of a sludge. This sludge after settling is filtered, and, if desired, may be washed with water, steamed, or blown with air, but not too thoroughly dried in air, and is then used over again in a repetition of the process, being substituted for the cuprous chloride or oxide previously specified. In case, however, there is a loss in copper, as may be determined by analysis, the deficiency may be, if desired, made up by adding enough more cuprous chloride or oxide to form the equivalent of that used in starting the process.

The aniline layer is worked up separately for aniline in the usual way.

We have not ascertained the exact nature or composition of the copper compounds that result from the foregoing treatment of the aqueous layer with caustic in the manner described, but we have found these compounds, or, in other words, the precipitate thus obtained to have a markedly beneficial effect in the promotion of the reaction between the chlorobenzene and ammonia, enabling a substantially complete conversion to be obtained within the temperature and pressure limits indicated and within a remarkably short time as compared with any procedure heretofore known, including the one whereby the present process is initiated, viz, using cuprous chloride or oxide.

If desired, the treatment with the caustic compound (using this term to include the oxide, hydroxide or equivalent compound of an alkaline earth metal as well as of an alkali metal) hereinbefore prescribed for the top, aqueous layer may be applied to the general mixture resulting from the main reaction, without, in other words, allowing such mixture to separate into the two layers as described. After freeing and driving off the ammonia by the causticizing step, the aniline oil will then be the lighter component of the mixture and form the top layer upon standing.

The copper compounds constituting the so-called "sludge" are not necessarily treated in the particular manner set forth, but may be used in the form in which they are precipitated, or after any other treatment which does not change their state of reduction; e. g. they may be dissolved in ammonia out of contact with the air and the resulting solution may then be employed in chlorobenzene-ammonia reaction mixture.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method of making aniline, the steps which consist in reacting between a monohalogenated benzene and aqueous ammonia in the presence of a cuprous compound, whereby a mixture of aniline oil and an aqueous solution of various copper compounds is produced, causticizing such solution, whereby a precipitate is formed of such compounds, and repeating the first step, using such precipitate for the cuprous compound therein.

2. In a method of making aniline, the steps which consist in reacting between a monohalogenated benzene and aqueous ammonia in the presence of a cuprous compound, whereby a mixture of aniline oil and an aqueous solution of various copper compounds is produced, separating such oil and solution, causticizing the latter, whereby a precipitate is formed of such compounds, and repeating the first step, using such precipitate for the cuprous compound therein.

3. In a method of making aniline, the steps which consist in heating in a suitable reaction chamber at a temperature of from approximately 150° to 250° C. and under a corresponding pressure a mixture of chlorobenzene and aqueous ammonia solution, in approximately the proportion of one molecule of the former to five molecules of anhydrous ammonia, in the presence of a cuprous compound, whereby a mixture of aniline oil and an aqueous solution of various copper compounds is produced, separating such oil and solution, causticizing the latter, whereby a precipitate is produced, washing such precipitate, and repeating the first step with such precipitate for the copper compound therein.

4. In a method of making aniline, the steps which consist in heating in a suitable reaction chamber at a temperature of from approximately 150° to 250° C. and under a corresponding pressure a mixture of chlorobenzene and aqueous ammonia solution, in approximately the proportion of one molecule of the former to five molecules of anhydrous ammonia, in the presence of cuprous chloride, whereby a mixture of aniline oil and an aqueous solution of various copper compounds is produced, separating such oil and solution, causticizing the latter, whereby a sludge is produced, washing such sludge, and repeating the first step with such sludge for the copper compound therein.

5. In a method of making aniline by reacting between a monohalogenated benzene and aqueous ammonia solution, the step which consists in introducing into the reaction mixture copper compounds derived by causticizing the product of a similar reaction in the presence of a cuprous compound.

6. In a method of making analine by reacting between a monohalogenated benzene and aqueous ammonia solution, the step which consists in introducing into the reaction mixture copper compounds derived by causticizing the solution resulting from a similar reaction in the presence of a cuprous compound.

7. In a method of making analine by reacting between chlorobenzene and aqueous ammonia solution, the step which consists in introducing into the reaction mixture copper compounds derived by causticizing the solution resulting from a similar reaction in the presence of cuprous chloride.

8. In a method of making analine by reacting between chlorobenzene and aqueous ammonia solution, the step which consists in introducing into the reaction mixture copper compounds derived by causticizing the solution resulting from a similar reaction in the presence of cuprous chloride and thereafter subjected to washing with water.

9. As an ingredient for promoting the reaction between a halogenated benzene and ammonia, the copper compounds derived by causticizing the solution resulting from a similar reaction in the presence of a cuprous compound.

10. As an ingredient for promoting the reaction between a halogenated benzene and ammonia, the copper compounds derived by causticizing the solution resulting from a similar reaction in the presence of a cuprous compound and thereafter subjected to washing with water.

11. In a method of making aniline, the steps which consist in reacting between a mono-halogenated benzene and aqueous ammonia in the presence of a cuprous compound, whereby a mixture including aniline and copper compounds is produced, causticizing, and repeating the first step, using the copper product for the cuprous compound therein.

12. As an ingredient for promoting the reaction between a halogenated benzene and ammonia, the copper compound derived from causticizing the product resulting from a similar reaction in the presence of a cuprous compound.

Signed by us this 6th day of February, 1926.

JOSEPH W. BRITTON.
WILLIAM H. WILLIAMS.